Sept. 29, 1931.   J. W. MARTIN, JR   1,825,645
METHOD OF TREATMENT OF MILK AND OTHER LIQUIDS
Filed Jan. 21, 1927
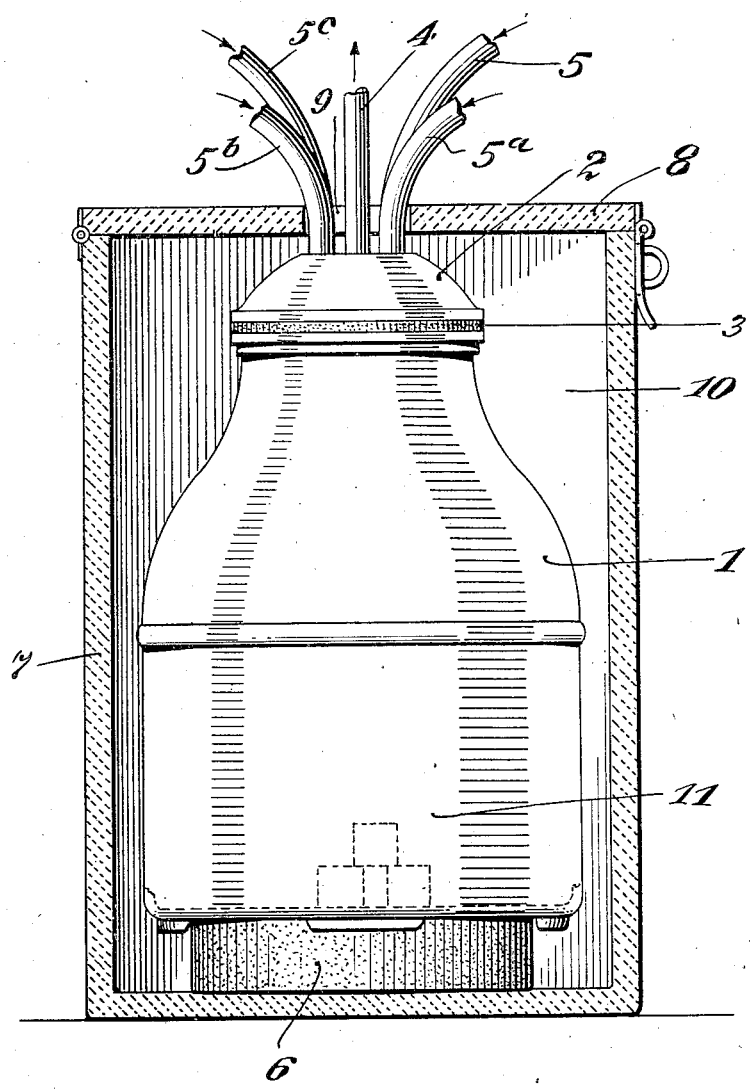
INVENTOR
James W. Martin, Jr.
BY
George Alleau
his ATTORNEY Patented Sept. 29, 1931

1,825,645

UNITED STATES PATENT OFFICE

JAMES W. MARTIN, JR., OF YONKERS, NEW YORK, ASSIGNOR TO DRYICE EQUIPMENT CORPORATION, OF NEW YORK, N. Y., A CORPORATION OF DELAWARE

METHOD OF TREATMENT OF MILK AND OTHER LIQUIDS

Application filed January 21, 1927. Serial No. 162,588.

My present invention was primarily devised for the very specific purpose of producing so-called "certified milk" in warm climates and under conditions where it has heretofore been found totally impossible to produce milk that will grade as "certified" by any method whatsoever, but my present method as a whole, as well as several steps thereof, may be usefully employed for more sanitary production of milk other than "certified" and in climates other than tropical.

As is well known, "certified milk" is unmodified, unpasteurized, clean, whole milk from healthy cows that has been milked and bottled under conditions precluding any modification or adulteration and in which the count of bacteria is at or below a specified predetermined minimum, which may be, say, 4000 per cubic centimeter. It is entirely practical to insure the desired conditions in cold or temperate climates even in summer time, but in warmer climates and tropical atmospheres, it has been found that no amount of cleanliness and care has been sufficient for the production of certified milk. For instance, in parts of Florida, where northern habit has created a demand for certified milk, it is now frequently imported from northern points, as far north as Minnesota, and sold at prices four or five times the standard price in the North.

Obviously, my method for insuring the production of such milk under impossible conditions of climate will also be extremely useful under more favorable conditions.

With the above and other specific objects in view, my invention involves the use of carbon dioxide, preferably in the form of so-called carbon dioxide snow or compound blocks, for the purpose of chilling the milk, preferably while the cow is being milked and for producing cold, perfectly sterile carbon dioxide gas for excluding the milk from possible contact with the atmospheric air, while it is being drawn from the cow. The same refrigerant and protective is employed to prevent any accumulation or multiplication of bacteria in the milking vessel or other apparatus from the instant it leaves the sterilizer until after it has been used for the milking.

Taken in order of time, therefore, my method includes first, sterilizing the milking vessel and immediately upon removal from the sterilizer, putting a desired quantity of frozen carbon dioxide into it. The heat of the vessel, whether of glass or of metal, will immediately impart heat to the solid, thereby accomplishing the double purpose of chilling the vessel below the temperature where bacteria can multiply to any extent and simultaneously filling the vessel with cold sterilized corbon dioxide gas, excluding the air and contamination that may be carried thereby. The gas thus evolved being approximately twice as heavy as air, can be retained in the vessel by gravity almost as if it were a liquid, and such losses as occur will be replenished and even over-replenished automatically by continued subliming of the frozen carbon dioxide. For this reason, a milking vessel of any depth, even an ordinary milk pail, can be kept cool and full of sterilized carbon dioxide gas during milking by hand in the ordinary way. Preferably, the carbon dioxide is much denser than milk so that it will not float even when bubbling copiously. Thus the bubbles rising through the milk will effect purging of volatile compounds such as give rise to the so-called "body odors". The continued supply of the very warm milk from the cow tends to prevent over-refrigeration and the rate as well as duration of the refrigeration may be regulated within wide limits by varying the density and surface area as well as the quantity of the solid carbon dioxide. If the amount of the solid is calculated for absorbing only a given number of heat units and the corresponding amount of milk is supplied within a reasonable time, the final temperature of milk can be accurately predetermined. If an over-carbonated condition results, it may be corrected by vacuumizing the milk prior to bottling it. In the case of the vacuum milking apparatus referred to below, the internal vacuum used for the milking will naturally minimize any such effect without any special treatment.

Preferably, the milking vessel will be of a type that can be immediately closed against inlet of air and in such case the solid carbon dioxide may become completely sublimated long before the utensil is used, the entire interior being sealed from atmospheric contamination by the enclosed body of the gas.

For the production of high grade milk under trying conditions, I prefer to employ the well known milking machines, comprising a milk receiving vessel into which the milk is drawn through tubes from the teats of the cow by simultaneous application of vacuum within the vessel and mechanical massage applied through the usual teat cups at the receiving ends of the tubes. The interior of such apparatus is preferably protected by applying frozen carbon dioxide within the vessel, immediately after sterilization. The cover being secured, the carbon dioxide expels the atmosphere not only from the vessel but also from the tubes and their terminal milking cups through which the milk is drawn.

Another feature of my method relates to externally refrigerating a milk receiving vessel during milking, preferably by arranging solid carbon dioxide exterior to the milk receiving vessel but in refrigerating relation thereto, as, for instance, by enclosing said vessel in a casing or jacket affording an interspace containing frozen carbon dioxide and maintaining the gas therefrom as a refrigerating jacket for the milk receiving vessel. In crudest form, this might include an ordinary wooden bucket with a cake of solid carbon dioxide on the bottom and a tin pail of smaller size resting on the solid. In such an arrangement, the solid would chill the pail directly while the gas would surround the pail and overflow into the top thereof, completely displacing the air. In such case, an additional piece of solid carbon dioxide may be placed within the milk receiving pail to act as above described.

In many, if not most, cases, it will be found that the presence of frozen carbon dioxide within the vessel during milking is unnecessary, provided the vessel be exteriorly refrigerated by solid carbon dioxide and protected as well as refrigerated by the sterile, cold gas therefrom.

In the annexed drawings, the figure shows in elevation the milk receiving vessel of a milking machine, the enclosing jacket being shown in vertical section and the vacuumizing and milk discharging tubes being diagrammatically indicated.

In this figure, the milk receiving vessel is shown as a can, 1, which may be of metal or glass, having fitted thereto a removable top, 2, with an intermediate gasket or packing, 3, whereby the vessel may be closed air-tight so as to sustain the vacuum. Any desired means, not shown, may be employed to detachably secure the cap to the vessel. The interior of the vessel is indicated as being vacuumized through tube 4 and the four rubber tubes through which the milk is drawn from the cow are indicated at 5, 5a, 5b, 5c.

The milk receiving vessel, 1, is shown as resting on a cake of solid carbon dioxide, 6, in the bottom of a jacket, 7, that may be of balsa wood or any other desired insulating material or construction. Preferably, the jacket is closed by cover 8, although it is not necessary that this cover be tight or, in fact, that it be used, its principal function being to keep out dirt and to prevent accidental spilling or blowing away of the protecting carbon dioxide gas more rapidly than it can be evaporated from the solid, 6. In practical operation, the supply of gas will be ample enough to make it entirely practical to have the vacuumizing and milk conducting tubes extend through an open hole, 9, in the top of the cover. The annular space, 10, around the neck of the bottle may be made sufficient to permit coiling of the tubes and milk drawing cups therein, while the apparatus is being transported from the sterilizer to the point of use.

I have indicated in dotted lines at 11, that a piece or pieces of solid carbon dioxide may be inserted within the bottle but, as explained above, these may or may not be completely sublimated by the time the milking operation begins. In any event, their more important function will be to chill the vessel and fill it with carbon dioxide gas immediately after sterilizing. Preferably, the cover will be applied before the interior solid has completely sublimated so that the outflow of gas will exclude and, so to speak, wash out all air, in the milking tubes.

When these tubes and the cup terminals thereof are stored in space 11, they will of course be brought out and caused or permitted to warm up to a physically comfortable temperature before use.

It will be noted that during use and when the vacuum is being applied, the milk receiving vessel, 1, is surrounded by the cold sterile gas so that if there are any inward leaks by reason of the internal vacuum, it will be the sterile and mildly sterilizing carbon dioxide gas which will be sucked in rather than contaminated atmosphere.

In practice, I find that ¼ to ½ pound of the solid carbon dioxide will be sufficient to completely cool and purge the milking machine immediately after it has been sterilized and to maintain it in sterilized condition until and while the milk is being introduced. About 1 pound of the solid per gallon of milk will be sufficient to cool the milk, during the milking operation down to approximately 50° F.

From this point on, the milk can be readily handled at sufficiently low temperatures to practically inhibit further bacteria growth, thereby rendering unnecessary the present practice of aerating, pasteurizing, etc. Such slight percentages of the carbon dioxide gas as can be absorbed by the milk, at the above indicated relatively high temperatures, and under the operating vacuum, will be highly beneficial, for even slight percentages will have a valuable preservative tendency, in addition to the service which it performs with reference to carrying off some of the more volatile and perishable constituents or ethers, which are the cause of the so-called body odors in the milk.

While it is possible that some other sterilized gaseous medium or some other refrigerant might be employed as a substitute for carbon dioxide and while some source of refrigerant and protective gas other than solid carbon dioxide, is conceivable, it will be evident there is great advantage in the peculiar specific combination which I have above described. One of these advantages well known to those familiar with the properties of carbon dioxide is that when heat is applied, it does not melt to a liquid but sublimates directly to gas at an extremely low temperature, the effective practical temperature of the evolved gas being approximately 85° below zero F., although the freezing point is much lower, approximately 114° below zero F. It is therefore well adapted to instantaneous chilling of the milk without affording any opportunity for multiplication of the few bacteria that inevitably accompany the milk from the cow.

In view of the phenomenally great temperature drop between the refrigerant medium and the milk, it will be evident that even the sheet metal of the milk receiving can will constitute substantial insulation, since it will operate to substantially slow down the rate of heat transfer and that if any moisture invades the jacket, it will be deposited as frost which may afford additional insulation. It will be obvious, however, that in any particular case, additional insulation may be provided, as for instance, by intervening gas filled space or even a piece of cardboard between the solid and the milk receiving vessel.

Milk which has been drawn from the cow under the conditions above described, into milk receiving vessels, which have been sterilized and kept sterile as above described, and the atmosphere within the vessel being sterile carbon dioxide gas as described, may be charged into dispensing bottles sterilized in like manner as the milk receiving bucket was sterilized, namely, by placing therein a small piece of solid carbon dioxide to displace the air. Milk drawn from the milk receiving vessel into such a bottle has practically no chance whatever for contact with the air. Preferably, the bottle is filled full and the usual paper sealing disc, with or without the usual protective cap, may be applied in the usual way. For this particular case, it is desirable that the amount of carbon dioxide gas dissolved in the milk be small enough so that there will be no gas evolution and blowing off of the cap as the result of any ordinary elevations of temperature such as are likely to be met with in practice between the time of sealing and the time of consumption by the purchaser. Such a condition does not necessarily preclude the use of solid carbon dioxide within the milk receiving vessel during milking because if necessary, excess gas may be withdrawn from the milk by vacuumizing, without raising the temperature, prior to sealing it in the dispensing bottle.

The above method of purging and chilling by heavy solid carbon dioxide generating gas that bubbles up within the body of the milk may be usefully employed for purging any milk, particularly for the removal of the initial body heat and odor from fresh milk immediately after milking, regardless of the milking method by which it was drawn from the cow.

While the above and other specific applications of the principle of my invention, may be employed separately or in combination, as will be appreciated by those skilled in the art, it is to be noted that the specific preferred method for the production of the purest, most natural grades of milk, particularly certified milk, involves the use of an intense externally applied refrigerant, capable of chilling, without over-refrigerating the milk, when and as it is drawn from the cow, preferably doing this by means of externally applied solid carbon dioxide, the refrigerant gas from which is retained as a protective insulating and refrigerant jacket in which the milking vessel is submerged. The preliminary feature of enclosing the solid carbon dioxide within the milk receiving vessel and applying the cover thereof immediately after sterilization is also employed, but the amount of the solid so enclosed should be such that it will mostly evaporate before actual milking begins, the ideal condition being where the vessel is cool and completely filled with the carbon dioxide atmosphere but contains little or perhaps none of the solid at the time when the warm milk begins to pour in, the maximum amount desirable at this time being insufficient to carbonate the milk beyond the percentage which will remain dissolved therein regardless of ordinary fluctuations of external temperature such as the dispensing bottle will be subjected to in commerce.

Of course, firmly-secured, pressure-sustaining corks or metal caps may be used and the milk heavily charged with the gas, for special purposes.

Obviously, some of the steps of my method are applicable to purging and sterile charging of perishable products into dispensing bottles, cans or other containers. For instance, a small piece of the solid carbon dioxide may be dropped into a bottle for beer or other aerated liquid, in order to chill and fill it with a sterile atmosphere, prior to filling it with the liquid; syrups, canned fruits, canned vegetables, etc., may be purged and slightly carbonated according to one of the methods described for milk either in the cans, before sealing, or before putting in the cans.

So much of my invention as concerns simultaneously refrigerating and purging of a liquid by direct internal action of the solid carbon dioxide is applicable in many specifically different relations, particularly for the treatment of fluids that are substantially lighter than the solid carbon dioxide but heavier than the gas and that have higher freezing points; also to fluid mixtures or solutions that have constituents capable of being either frozen or precipitated upon great reduction of temperature. This principle is particularly applicable to the art of separating hydrocarbons of different freezing points. The solid carbon dioxide being submerged in the bottom of the liquid, automatically causes solidification of a solidifiable or precipitable constituent. In a fluid-solid mixture produced in this or in any other way, the rising carbon dioxide gas tends to carry the crystal or other particles to the surface. The more minute or difficult of separation these particles, the more advantageous this effect will be. Even where the crystals are of much less specific gravity than the liquid, this method of accelerating their separation is of great practical importance.

Considered in its broader aspects, the refrigerating and purging contemplated by this part of my invention would be served by direct discharge of liquid carbon dioxide in the lower part of the liquid with proper provision for refrigerative expansion and distributed bubbling of the resultant gas.

A cold protective atmosphere of the carbon dioxide gas may be most effectively preserved adjacent the surface of any liquid, and the refrigeration of the liquid itself may be reduced to a minimum by applying the frozen carbon dioxide in such porous comminuted or snow form that it will float on the top of the liquid instead of sinking. This variation is applicable within the milk receiving vessel of a milking machine during milking, the carbonating effect in such case being very much less than where dense solid is used that sinks to the bottom of the liquid and bubbles up through it.

A very different application is preventing or extinguishing fires on the top of an oil tank. In such case, if a dense form of carbon dioxide is used, it will sink to the bottom and will melt according to the normal temperature of the oil. The resulting gas, bubbling up from the bottom of the oil, will reach the surface at a relatively high temperature. On the other hand, if the frozen carbon dioxide is snow or sufficiently porous or comminuted solid, it will float on the surface. If the surface is afire, the frozen carbon dioxide will be converted into gas at a vastly greater rate and the unmodified cold, as well as combustion smothering effect of the gas, will be directly applied where it is most needed. On the other hand, the natural evaporation rate where there is no fire will be much slower because only the lower surface of the floating solid will be in contact with the oil while the other surfaces will be blanketed and insulated by the gas already evolved.

I claim:

1. The method which includes milking and discharging the milk, as drawn from the cow, into a vessel while exteriorly refrigerating, insulating and protecting the same by providing solid carbon dioxide in heat absorbing relation to the receiving vessel and by retaining the resultant cold carbon dioxide gas as an enveloping atmosphere for the vessel.

2. The method which includes milking and discharging the milk, as drawn from the cow, into a vessel while exteriorly refrigerating, insulating and protecting the same by providing solid carbon dioxide in heat absorbing relation to the receiving vessel and by retaining the resultant cold carbon dioxide gas as an enveloping atmosphere for the vessel; charging the then protected milk into service containers which have been sterilized and immediately chilled and protected from atmosphere by placing frozen carbon dioxide therein and permitting the same to sublimate to slowly and non-turbulently expel air therefrom; and finally sealing the thus filled container.

3. The method which includes hot-cleaning a milk receiving vessel and immediately chilling and excluding air therefrom by enclosing solid carbon dioxide therein and permitting the same to sublimate to slowly and non-turbulently expel air therefrom; discharging the milk as drawn from the cow into said vessel while exteriorly refrigerating, insulating and protecting the same by providing solid carbon dioxide in heat absorbing relation to the receiving vessel and by retaining the resultant cold carbon dioxide gas as an enveloping atmosphere for the vessel, charging the thus protected milk into service containers which have been sterilized and then chilled and protected from atmosphere by placing frozen carbon dioxide therein and permitting the same to sublimate to slowly and non-turbulently expel air therefrom; and sealing each thus filled container.

Signed at New York, in the county of New York and State of New York this 19th day of January, A. D. 1927.

JAMES W. MARTIN, Jr.